Nov. 25, 1952 | E. A. GOLDBERG | 2,619,594
ELECTRONIC SWITCHING DEVICE
Filed March 30, 1951
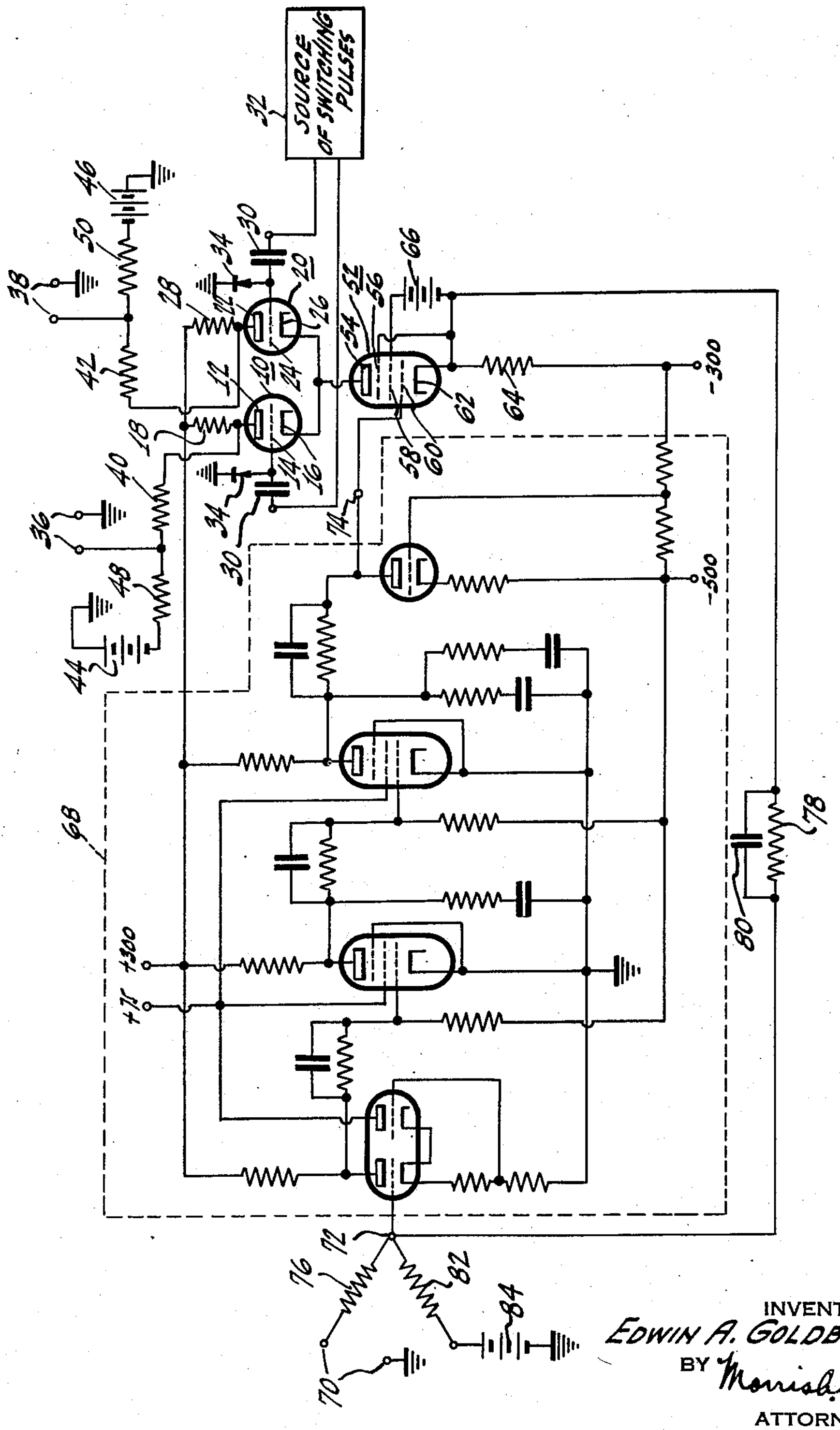
INVENTOR
EDWIN A. GOLDBERG
BY Morris A. Rabkin
ATTORNEY Patented Nov. 25, 1952 2,619,594

UNITED STATES PATENT OFFICE 2,619,594

ELECTRONIC SWITCHING DEVICE

Edwin A. Goldberg, Princeton Junction, N. J., assignor to Radio Corporation of America, a corporation of Delaware Application March 30, 1951, Serial No. 218,351

6 Claims. (Cl. 250—27)

This invention relates to an electrically controlled electronic switch for coupling a signal source to an output circuit, and more specifically to an improvement whereby an electronic switch is made a linear device.

In an application by this applicant for an "Electronic Switch" which was filed on January 12, 1950, and bears Serial No. 138,168, there is described and claimed an electronic switch of the general type contemplated herein. This switch is of the type wherein a pair of electron discharge tubes have a common cathode impedance in the form of a third electron discharge tube. A source of signals to be switched is coupled to the third tube, while a source of switching signals is applied to the pair of discharge tubes whereby an output may be derived corresponding to the signals applied to the third electron tube from the one of the pair of tubes which is switched on. The switch operates satisfactorily except in applications wherein a strictly linear relationship is required between the signal input and the output from the discharge tube which is switched on. Because of the inherent non-linearity of the electron discharge devices being used, such non-linearity exists. In many electronic computing devices there is required a fast operating switch having a highly linear relationship between input and output.

It is therefore an object of the present invention to provide an improved, novel, electronic switch having an output substantially linearly related to its input.

It is a further object of the present invention to provide an improved electronic switch which is suitable for applications requiring high precision.

These and further objects of the invention are achieved by providing an electronic switch of the type described above wherein a pair of electron discharge tubes have a common cathode impedance in the form of a third electron discharge tube. However, the third electron discharge tube has a cathode load impedance connected to its cathode. Input signals are applied to a high gain direct coupled amplifier. The amplifier output is connected to the third tube grid and feedback is taken from the third tube cathode to the input of the direct coupled amplifier to oppose the applied signals. Switching signals are applied to the grids of the pair of tubes and output is derived from each of the anodes of the pair of tubes.

The novel features of the invention, as well as the invention itself, both as to its organization and method of operation, will best be understood from the following description, when read in connection with the accompanying drawing, which is a circuit diagram of an embodiment of the invention.

Referring now to the drawing, there is shown a pair of electron discharge tubes 10, 20 which may be called the switching tubes. Each switching tube has its own anode load resistor 18, 28 connecting its anode to a source of B+ potential. The grid 14, 24 of each switching tube is connected through a coupling condenser, 30, to a source of switching signals 32. The diode rectifiers 34 connecting the respective grids 14, 24 to ground are merely inserted for the purpose of establishing the maximum positive direct coupled level of the grids at zero volts, regardless of the waveform of the switching voltage. Output terminals 36, 38 are connected to the respective switching tube anodes 12, 22 through separate resistors 40, 42. A separate source of bucking potential 44, 46 is provided for each switching tube 10, 20 and is connected to the respective output terminals 36, 38 through separate resistors 48, 50. The reason for providing the two bucking potential sources 44, 46 is, that when the subject electronic switch is used in a direct coupled system, the bucking potential sources insure that with a zero signal input to the switch there will be a zero signal output provided. Of course, the system may also be used in an alternating current coupled system, in which event the series resistors and bucking potential sources may be dispensed with and a condenser may be used instead to couple each switching tube anode to a respective output terminal.

Another electron discharge tube 52, also known as a current control tube because it controls the current flowing in each of the switching tubes, is connected to both cathodes 16, 26 of the switching tubes. A cathode load impedance 64 in the form of a resistor is connected to the cathode 12 of the current control tube 52. Negative bias is applied to the free end of the cathode resistor 64. A source of screen potential 66 is connected between the screen grid 58 and the cathode 62 in order that the plate current of the current control tube be substantially the same as the current through the cathode load resistor 64. The suppressor grid 56 is connected directly to the cathode 62. Within the dotted lines is shown the circuit of a typical high gain direct coupled amplifier 68. Any stable, high gain direct coupled amplifier may be used. The high gain direct coupled amplifier has its output 74 connected to the grid 60 of the current control tube.

A signal input terminal 70 is provided to which signals to be switched are applied. This is connected to the direct coupled amplifier input 72 through a resistor 76. The cathode 64 of the current control tube is also connected to the direct coupled amplifier input 72 through a resistor 78 in parallel with a high frequency bypass condenser 80. Another resistor 82 connects a fixed bucking voltage source 84 to the direct coupled amplifier input 72.

In operation, signals to be switched are applied to the signal input terminal 70 and are amplified by the high gain direct coupled amplifier 68. These signals are then applied to the current control tube grid 60. Switching signals are applied to the grids 14, 24 of the switching tubes 10, 20 in order to render conductive the one of the two tubes from which an output is desired. Thus the grid of the switching tube from which an output is desired is made more positive with respect to the grid of the other switching tube by an amount at least equal to the cut off voltage of the other tube. In this manner all the current flowing through the anode of the current control tube 52 is made to flow through the desired switching tube and an output may be derived from the anode thereof. The current, which flows through the current control tube cathode load resistor 64, is representative of the current flowing through the current control tube anode and the switching tube. The voltage, which is fed back from the current control tube cathode 62 to the direct coupled amplifier input 72, is in phase opposition to the signal input voltage and operates to linearize the output derived from the switching tubes by causing cancellation of undesirable components introduced into the signal by the switching system.

The higher the gain of the direct coupled amplifier, the more linear the resultant output from the switching tubes. A stabilized direct coupled amplifier described and claimed in an application by this applicant and Jules Lehmann, Serial No. 90,072, filed April 28, 1949, and entitled "Direct Current Amplifiers," has been used in an embodiment of this invention and found to provide excellent results. The values of the feedback resistor 78 and resistor 76 connecting the signal input 70 to the amplifier input 72 determine the amount of feedback voltage and thereby the gain of the amplifier. Variation of these values may be used to introduce a scale factor into the switch device. A bucking voltage 84 is provided at the D. C. amplifier input in order to establish a reference level for the current of the switch. This may be omitted if desired. As previously stated, bucking voltages are provided at the switch outputs in order that this direct coupled switch provide a zero output voltage when a switching tube is non-conductive or a zero signal is applied to the signal input terminal 72. This latter feature is an extremely desirable one for most computer applications. With respect to the switching of the switching tubes, although signals of the push-pull type have been described as being required, the circuit may also be adapted for single ended type operation. This may be done by applying a fixed bias to one of the switching tube grids which is positive with respect to the other switching tube grid by an amount at least equal to the other tube cut off voltage, and then applying switching signals to the other tube grid which are more positive than the fixed bias by an amount equal to the cut off voltage of the one switching tube. In this manner, the one switching tube provides an output in the absence of a switching signal applied to the other tube grid. Although the current control tube has been shown and described as a tetrode tube, a triode may be used. A tetrode or pentode tube is preferred because its dynamic plate impedance is much higher than for a triode and smaller grid swings are necessary during switching in order to maintain the proper plate current; thus a less stringent transient response is required of the direct coupled amplifier for satisfactory operation of the switch.

From the foregoing description, it will be readily apparent that there has been provided an improved and novel electronic switch which is substantially linear and is suitable for applications requiring high precision.

What is claimed is:

1. A linear, electronic switch comprising a pair of electron discharge tubes, means for applying switching signals of said tubes, a common cathode impedance for said pair of tubes including a current control electron discharge tube, an amplifier having an input and an output, said amplifier output being connected to said current control tube grid, means to apply signals to be switched to said amplifier input, and means to apply a voltage from said current control tube to said amplifier to oppose said signals applied to said amplifier input.

2. A linear electronic switch comprising a current control electron discharge tube having anode, cathode and grid electrodes, a cathode load impedance connected to said current control tube cathode, a high gain direct coupled amplifier having an input and an output, said amplifier output being coupled to said current control tube grid, means to apply signals to be switched to said amplifier input, means to apply a voltage from said current control tube cathode to said amplifier input, a pair of electron discharge tubes each having anode, cathode and control grid electrodes, the cathodes of said pair of tubes being connected to said current control tube anode, means to apply switching signals to the grids of said pair of tubes, and means to derive an output from each of the anodes of said pair of tubes.

3. A linear electronic switch comprising a pair of electron discharge tubes, means for applying switching signals to said pair of tubes, a common cathode impedance for said pair of tubes, said impedance including a current control electron discharge tube having anode, cathode and control grid electrodes, and a cathode load impedance connected in series with the cathode of said current control tube, a direct coupled amplifier, a signal input terminal, said direct coupled amplifier having its input connected to said signal input terminal and its output connected to said current control tube grid, and a feedback resistor connected between said current tube cathode and said amplifier input.

4. A linear electronic switch comprising a pair of switching electron discharge tubes each having anode, cathode and grid electrodes, means to apply switching signals to said switching tube grids, means to derive an output from each of said switching tube anodes, a current control electron discharge tube having anode, cathode and grid electrodes, said current control tube anode being connected to both said switching tube cathodes, a cathode load resistor connected in series with said current control tube cathode, a signal input terminal, a direct coupled amplifier having its input coupled to said signal input terminal and its output coupled to said current control tube grid, and a feedback resistor connected between said current control tube cathode and said direct coupled amplifier input terminal.

5. A linear electronic switch comprising a current control electron discharge tube having anode, cathode, control grid and screen grid electrodes, means to apply screen grid voltage connected between said current control tube cathode and screen electrodes, a cathode load resistor connected to said cathode, a signal input terminal, a high gain direct coupled amplifier having an input and an output, means coupling said signal input terminal to said amplifier input terminal, means coupling said amplifier output to said current control tube grid, a resistor coupling said current control tube cathode to said amplifier input, a pair of electron discharge tubes each having anode, cathode and control grid electrodes, the cathodes of said pair of tubes being connected to the anode of said current control tube, means to apply switching signals to the grids of said pair of tubes and means to derive an output from the anode of each of said pair of tubes.

6. A linear electronic switch as recited in claim 5 wherein said means to derive an output from the anode of each of said pair of tubes includes, for each of said pair of tubes, an output terminal, a resistor connecting said output terminal to said tube anode, a source of bucking potential, and a second resistor connecting said source of bucking potential to said output terminal whereby a zero signal output is obtained at said output terminals when a signal applied to said signal input terminal is zero or when one of said pair of tubes is non-conductive.

EDWIN A. GOLDBERG.

REFERENCES CITED

The following references are of record in the file of this patent:

UNITED STATES PATENTS

| Number | Name | Date |
|---|---|---|
| 2,396,395 | Smith et al. | Mar. 12, 1946 |
| 2,464,353 | Smith et al. | Mar. 15, 1949 |